(12) United States Patent
Furukawa

(10) Patent No.: US 11,056,270 B2
(45) Date of Patent: Jul. 6, 2021

(54) MAGNETIC FILM AND COIL MODULE

(71) Applicant: NITTO DENKO CORPORATION, Ibaraki (JP)

(72) Inventor: Yoshihiro Furukawa, Osaka (JP)

(73) Assignee: NITTO DENKO CORPORATION, Ibaraki (JP)

( * ) Notice: Subject to any disclaimer, the term of this patent is extended or adjusted under 35 U.S.C. 154(b) by 542 days.

(21) Appl. No.: 16/073,852

(22) PCT Filed: Feb. 22, 2017

(86) PCT No.: PCT/JP2017/006601
§ 371 (c)(1),
(2) Date: Jul. 30, 2018

(87) PCT Pub. No.: WO2017/150301
PCT Pub. Date: Sep. 8, 2017

(65) Prior Publication Data
US 2019/0035535 A1 Jan. 31, 2019

(30) Foreign Application Priority Data

Mar. 1, 2016 (JP) .............................. JP2016-038819
Feb. 6, 2017 (JP) .............................. JP2017-019492

(51) Int. Cl.
*H01F 27/24* (2006.01)
*H01F 27/28* (2006.01)
(Continued)

(52) U.S. Cl.
CPC ........... *H01F 27/2804* (2013.01); *B32B 7/02* (2013.01); *H01F 1/26* (2013.01); *H01F 1/342* (2013.01);
(Continued)

(58) Field of Classification Search
USPC ........................................................ 336/218
See application file for complete search history.

(56) References Cited

U.S. PATENT DOCUMENTS 7,030,828 B2 *  4/2006  Kato ..................... H01Q 1/273
                                                          343/713
7,323,214 B2 *  1/2008  Wakayama ............... H01F 1/18
                                                          427/127
(Continued)

FOREIGN PATENT DOCUMENTS

CN           1965444 A         5/2007
CN         101536121 A         9/2009
(Continued)

OTHER PUBLICATIONS

Office Action dated Jul. 8, 2020 from the Intellectual Property Office of Taiwan in Application No. 106106602.
(Continued)

*Primary Examiner* — Ronald Hinson
(74) *Attorney, Agent, or Firm* — Sughrue Mion, PLLC

(57) ABSTRACT

A magnetic film includes a first layer having a real part of complex magnetic permeability of 50 or more and an imaginary part of complex magnetic permeability of below 30 at 10 MHz, and a second layer provided on the first layer and having a real part of complex magnetic permeability of 50 or more and an imaginary part of complex magnetic permeability of 30 or more at 10 MHz.

8 Claims, 2 Drawing Sheets

(51) Int. Cl.
  *B32B 7/02* (2019.01)
  *H01F 1/26* (2006.01)
  *H04B 5/00* (2006.01)
  *H02J 50/10* (2016.01)
  *H01F 1/34* (2006.01)
  *H01F 38/14* (2006.01)
  *H01Q 7/06* (2006.01)

(52) U.S. Cl.
  CPC ............... *H01F 38/14* (2013.01); *H01Q 7/06* (2013.01); *H02J 50/10* (2016.02); *H04B 5/0037* (2013.01); *H04B 5/0081* (2013.01); *B32B 2457/00* (2013.01)

(56) References Cited

U.S. PATENT DOCUMENTS

| | | | |
|---|---|---|---|
| 2005/0237254 A1* | 10/2005 | Kato | H01Q 7/06 343/788 |
| 2009/0146898 A1 | 6/2009 | Akiho et al. | |
| 2010/0001226 A1 | 1/2010 | Aramaki et al. | |
| 2014/0132210 A1 | 5/2014 | Partovi | |
| 2016/0083626 A1 | 3/2016 | Ebe et al. | |
| 2017/0209924 A1* | 7/2017 | Suetsuna | C22C 38/02 |
| 2017/0223878 A1* | 8/2017 | Lee | H02J 7/025 |

FOREIGN PATENT DOCUMENTS

| | | |
|---|---|---|
| CN | 105071022 A | 11/2015 |
| JP | 2006-245950 A | 9/2006 |
| JP | 2008-135724 A | 6/2008 |
| JP | 2009-099809 A | 5/2009 |
| JP | 2014-189015 A | 10/2014 |
| WO | 2010/129369 A2 | 11/2010 |

OTHER PUBLICATIONS

International Search Report for PCT/JP2017/006601 dated Apr. 25, 2017.
Notification of First Office Action dated Jan. 14, 2020 from the China National Intellectual Property Administration in Application No. 201780011069.6.
Extended European Search Report dated Oct. 1, 2019, from the European Patent Office in counterpart European Application No. 17759767.1.
Michael Gebhart, et al., "Active Load Modulation for Contactless Near-Field Communication", IEEE International Conference on RFID—Technologies and Applications (RFID-TA), Nov. 5, 2012, pp. 228-233 (6 pages total).
Notification of Reasons for Refusal dated Feb. 9, 2021, issued by the Japanese Patent Office in application No. 2017-019492.

* cited by examiner

10

11

MAGNETIC FILM AND COIL MODULE

This is a National Stage of International Application No. PCT/JP2017/006601 filed Feb. 22, 2017, which claims priority from Japanese Patent Application No. 2016-038819 filed Mar. 1, 2016, and Japanese Patent Application No. 2017-019492 filed Feb. 6, 2017; the entire disclosures are hereby incorporated by reference.

TECHNICAL FIELD

The present invention relates to a magnetic film and a coil module using the magnetic film.

BACKGROUND ART

A position detection device having a pen-type position indicator for detecting a position by moving the pen on a position detection plane is called a digitizer, and is widely spread as an input device for computers. The position detection device includes a position detection flat plate, and a circuit board disposed therebelow and having loop coils formed on the surface of the board. Then, the position of the position indicator is detected by using electromagnetic induction having a frequency band of around 500 kHz generated by the position indicator and the loop coils.

Patent Document 1 has proposed, for example, a method in which a magnetic layer is disposed on a circuit board for efficient electromagnetic induction, and consequently efficient communication by controlling a magnetic flux generated at the time of the electromagnetic induction.

Patent Document 1 discloses a magnetic film laminated circuit board sequentially including a circuit board, a front layer, and a magnetic layer containing soft magnetic particles.

CITATION LIST

Patent Document

Patent Document 1: Japanese Unexamined Patent Publication No. 2014-189015

SUMMARY OF THE INVENTION

Problem to be Solved by the Invention

Recently, NFC (near field communication, short-range wireless communication) represented by a contactless IC card or the like has come into practical use, and has been widely spread. NFC uses a frequency band in a higher frequency region than that of the position detection device. Also, in wireless power transmission (contactless power transmission) which has recently come into practical use, a method using a high frequency band has been considered. A coil module used in the wireless communication and the wireless power transmission is designed so as to have the maximum properties at a resonance frequency of 13.56 MHz or 6.78 MHz.

In the wireless communication and the wireless power transmission using the high frequency, a magnetic flux converged around the loop coils is large, so that the magnetic flux easily leaks other than the loop coils. When the magnetic flux leaks, it interferes with a metal member (metal casing, battery, or the like) around it, and it may have a negative influence. Thus, further improvement of the magnetic shield properties that prevent leakage of magnetism is required.

Meanwhile, as a method for improving the magnetic shield properties, a method of losing the magnetic flux can be used, but in the method of losing the magnetic flux, the magnetic flux used in communication is reduced, so that there is a disadvantage that the communication properties are reduced.

An object of the present invention is to provide a magnetic film capable of improving the magnetic shield properties and the communication properties, and a coil module using the magnetic film.

Means for Solving the Problem

The present invention [1] includes a magnetic film including a first layer having a real part of complex magnetic permeability of 50 or more and an imaginary part of complex magnetic permeability of below 30 at 10 MHz, and a second layer provided on the first layer and having a real part of complex magnetic permeability of 50 or more and an imaginary part of complex magnetic permeability of 30 or more at 10 MHz.

The present invention [2] includes the magnetic film described in [1], wherein the real part of complex magnetic permeability of the second layer is higher than that of the first layer.

The present invention [3] includes the magnetic film described in [1] or [2], wherein the thickness of the second layer is smaller than that of the first layer.

The present invention [4] includes the magnetic film described in [3], wherein the ratio of the thickness of the second layer to that of the first layer is ½ or less.

The present invention [5] includes the magnetic film described in any one of [1] to [4], wherein the first layer contains soft magnetic particles and a resin.

The present invention [6] includes the magnetic film described in any one of [1] to [4], wherein the first layer is made of a sintered body of a soft magnetic oxide.

The present invention [7] includes the magnetic film described in any one of [1] to [6], wherein the second layer contains soft magnetic particles and a resin.

The present invention [8] includes a coil module for wireless communication or wireless power transmission using a frequency band of 13.56 MHz or 6.78 MHz including a coil board including a board and a coil pattern provided at one side in a thickness direction of the board, and the magnetic film described in any one of [1] to [7] provided at one side in the thickness direction of the coil module so as to allow the first layer to face the coil pattern.

Effect of the Invention

The magnetic film of the present invention can improve the magnetic shield properties and the communication properties of the coil module. The coil module of the present invention has excellent magnetic shield properties and excellent communication properties.

DESCRIPTION OF EMBODIMENTS

Figure 1:
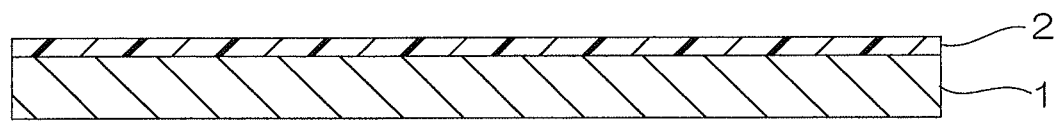
FIG. 1 shows a cross-sectional view of one embodiment of a magnetic film of the present invention.

In FIG. 1, the up-down direction of the paper surface is referred to as an up-down direction (thickness direction, first direction), the upper side of the paper surface is referred to as an upper side (one side in the thickness direction, one side in a first direction), and the lower side of the paper surface is a lower side (the other side in the thickness direction, the other side in the first direction). Figures other than FIG. 1 also conform to the directions of FIG. 1.

As shown in FIG. 1, a magnetic film 10 has, for example, a film shape (including a sheet shape) having a predetermined thickness, and has a flat upper face and a flat lower face.

The magnetic film 10 is, for example, one component of a coil module 11 to be described later or the like, that is, not the coil module 11. That is, the magnetic film 10 is a component for producing the coil module 11 or the like, does not include a coil board 4, and includes a first layer 1 and a second layer 2 to be described later. The magnetic film 10 is an industrially available device which alone can be circulated.

To be specific, as shown in FIG. 1, the magnetic film 10 includes the first layer 1 and the second layer 2 that is disposed on the upper surface (one surface) thereof. Preferably, the magnetic film 10 is made of the first layer 1 and the second layer 2.

The first layer 1 has a film shape.

The first layer 1, along with the second layer 2, is a layer for improving the magnetic shield properties and the communication properties of the coil module 11.

In the first layer 1, a real part ($\mu'$) of complex magnetic permeability at 10 MHz is 50 or more, preferably, 70 or more, more preferably 80 or more, further more preferably 100 or more, and for example, 1000 or less, preferably 800 or less, more preferably 600 or less, further more preferably 300 or less. By setting the real part of complex magnetic permeability within the above-described range, a magnetic flux can be converged at the inside of the magnetic film 10, and the magnetic shield properties can be improved.

An imaginary part ($\mu''$) of complex magnetic permeability at 10 MHz is below 30, preferably 20 or less, more preferably 15 or less, and for example, 0.01 or more, preferably 0.1 or more. By setting the imaginary part of complex magnetic permeability within the above-described range, a loss of the magnetic flux in the magnetic film 10 can be reduced, and a reduction of the communication properties can be suppressed.

The real part of complex magnetic permeability of the first layer 1 is higher than the imaginary part of complex magnetic permeability of the first layer 1, and a difference between the real part of complex magnetic permeability and the imaginary part of complex magnetic permeability is, for example, 50 or more, preferably 100 or more, and for example, 1000 or less, preferably 200 or less. By setting the difference within the above-described range, leakage of a magnetic field can be suppressed, while the communication properties are retained.

In the present invention, the real part $\mu'$ of complex magnetic permeability and the imaginary part $\mu''$ of complex magnetic permeability of each of the layers (the first layer 1 or the second layer 2) are measured by a one-turn method (frequency of 10 MHz) by using an impedance analyzer (manufactured by Agilent Technologies, "4294A").

The thickness of the first layer 1 is, for example, 10 μm or more, preferably 30 μm or more, more preferably 80 μm or more, and for example, 2000 μm or less, preferably 1500 μm or less, more preferably 1000 μm or less, further more preferably 500 μm or less.

The first layer 1 is, for example, formed from a first magnetic composition containing soft magnetic particles and a resin into a film shape. The first layer 1 has excellent impact resistance, excellent crack resistance, and excellent molding properties by using the soft magnetic particles and the resin in combination.

The soft magnetic particles used in the first layer 1 are particles (low $\mu''$ soft magnetic particles) formed from a material having a high real part ($\mu'$) of complex magnetic permeability and a small imaginary part ($\mu''$) of complex magnetic permeability.

Examples of the material of the soft magnetic particles for the first layer 1 include magnetic stainless steel (Fe—Cr—Al—Si alloy), Fe—Si—Al alloy, Fe—Ni alloy, silicon copper (Fe—Cu—Si alloy), Fe—Si alloy, Fe—Si—B(—Cu—Nb) alloy, Fe—Si—Cr—Ni alloy, Fe—Si—Cr alloy, Fe—Si—Al—Ni—Cr alloy, and ferrite.

As the soft magnetic particles of the first layer 1, in particular, the soft magnetic particles having a coercive force in an easy direction of magnetization of, for example, 2.1 (Oe) or more, preferably 2.5 (Oe) or more, and for example, 10 (Oe) or less, preferably 5.0 (Oe) or less, more preferably 3.5 (Oe) or less are used.

The coercive force can be, for example, measured with a vibrating sample magnetometer.

These soft magnetic particles can be used alone or in combination of two or more.

Examples of the shape of the particle include bulk shape, flat shape (plate shape), and needle shape. Examples of the bulk shape include spherical shape, rectangular parallelepiped shape, granular shape, roundish shape, aggregate, or deformed shape thereof. In view of excellent real part of complex magnetic permeability and improvement of magnetic shield properties, preferably, a flat shape is used.

The aspect ratio of the soft magnetic particles of the first layer 1 is, for example, 8 or more, preferably 15 or more, and for example, 500 or less, preferably 450 or less. The aspect ratio is, for example, calculated as an aspect ratio obtained by dividing the average particle size of the particle by an average thickness of the soft magnetic particle.

The average particle size (average value of maximum length) of the soft magnetic particles of the first layer 1 is, for example, 3.5 μm or more, preferably 10 μm or more, more preferably 20 μm or more, and for example, 200 μm or less, preferably 150 μm or less, more preferably 80 μm or less, further more preferably 40 μm or less. The average thickness thereof is, for example, 0.1 μm or more, preferably 0.2 μm or more, and for example, 3.0 μm or less, preferably 2.5 μm or less. By adjusting the aspect ratio, the average particle size, and the average thickness of the soft magnetic particles, demagnetization effects of the soft magnetic particles can be reduced, and as a result, the magnetic permeability and the coercive force of the soft magnetic particles can be adjusted. To equalize the size of the soft magnetic particles, as necessary, those soft magnetic particles classified with, for example, a sieve can be used. The average particle size can be, for example, measured with a laser diffraction particle size analyzer, and the average thickness can be, for example, measured with a scanning electron microscope (SEM).

The mass ratio of the soft magnetic particles in the first magnetic composition in terms of solid content is, for example, 60 mass % or more, preferably 80 mass % or more, more preferably 85 mass % or more, and for example, 98 mass % or less, preferably 95 mass % or less. The volume ratio of the soft magnetic particles in the first magnetic composition in terms of solid content is, for example, 40% by volume or more, preferably 50% by volume or more, and for example, 90% by volume or less, preferably 70% by volume or less. By setting the content ratio of the soft magnetic particles in the above-described lower limit or more, the magnetic film 10 has excellent magnetic shield properties. Meanwhile, by setting the content ratio of the soft magnetic particles in the above-described upper limit or less, the first magnetic composition has excellent film forming properties.

Examples of the resin include a thermosetting resin and a thermoplastic resin.

Examples of the thermosetting resin include epoxy resin, phenol resin, melamine resin, thermosetting polyimide resin, unsaturated polyester resin, polyurethane resin, and silicone resin. In view of adhesive properties and heat resistance, preferably, an epoxy resin and a phenol resin are used, more preferably, an epoxy resin and a phenol resin are used in combination.

Examples of the epoxy resin include bifunctional epoxy resins such as bisphenol A epoxy resin, bisphenol F epoxy resin, modified bisphenol A epoxy resin, modified bisphenol F epoxy resin, and biphenyl epoxy resin and trifunctional or more of multifunctional epoxy resins such as phenol novolak epoxy resin, cresol novolak epoxy resin, trishydroxyphenylmethane epoxy resin, tetraphenylolethane epoxy resin, and dicyclopentadiene epoxy resin. These epoxy resins can be used alone or in combination of two or more.

Preferably, a trifunctional or more of multifunctional epoxy resin is used, more preferably, a cresol novolak epoxy resin is used. By using the epoxy resin, the strength, the film forming properties, and the adhesive properties of the first layer 1 and the second layer 2 are excellent.

The epoxy equivalent of the epoxy resin is, for example, 230 g/eq. or less, preferably 210 g/eq. or less, and for example, 10 g/eq. or more, preferably 50 g/eq. or more.

The phenol resin is a thermosetting resin that is a curing agent for the epoxy resin, and examples thereof include trifunctional or more of multifunctional phenol resins such as phenol novolak resin, cresol novolak resin, phenol aralkyl resin, phenol biphenylene resin, dicyclopentadiene phenol resin, and resol resin. These phenol resins can be used alone or in combination of two or more. Preferably, a phenol biphenylene resin is used.

The hydroxyl equivalent of the phenol resin is, for example, 230 g/eq. or less, preferably 210 g/eq. or less, and for example, 10 g/eq. or more, preferably 50 g/eq. or more.

Examples of the thermoplastic resin include acrylic resin, ethylene-vinyl acetate copolymer, polycarbonate resin, polyamide resin (6-nylon, 6,6-nylon, or the like), thermoplastic polyimide resin, and saturated polyester resin (PET, PBT, or the like). Preferably, an acrylic resin is used.

An example of the acrylic resin includes an acrylic polymer obtained by polymerizing a monomer component of one, or two or more of straight chain or branched alkyl (meth)acrylate ester having an alkyl group. "(Meth)acrylic" represents "acrylic and/or methacrylic".

An example of the alkyl group includes an alkyl group having 1 to 20 carbon atoms such as methyl group, ethyl group, propyl group, isopropyl group, n-butyl group, t-butyl group, isobutyl group, amyl group, isoamyl group, hexyl group, heptyl group, cyclohexyl group, 2-ethylhexyl group, octyl group, isooctyl group, nonyl group, isononyl group, decyl group, isodecyl group, undecyl group, lauryl group, tridecyl group, tetradecyl group, stearyl group, octadecyl group, and dodecyl group. Preferably, an alkyl group having 1 to 6 carbon atoms is used.

The acrylic polymer can be a copolymer of the alkyl (meth)acrylate ester and an additional monomer.

Examples of the additional monomer include glycidyl group-containing monomers such as glycidylacrylate and glycidylmethacrylate; carboxyl group-containing monomers such as acrylic acid; acid anhydride monomers such as maleic anhydride; hydroxyl group-containing monomers such as 2-hydroxyethyl (meth)acrylate; phosphoric acid group-containing monomers including sulfonic acid group-containing monomers such as styrenesulfonic acid; styrene monomer; and acrylonitrile. These monomers can be used alone or in combination of two or more.

The weight average molecular weight of the acrylic resin is, for example, $1 \times 10^5$ or more, preferably $3 \times 10^5$ or more, and for example, $1 \times 10^6$ or less. The weight average molecular weight is measured by gel permeation chromatography (GPC) based on a polystyrene standard calibration value.

The content ratio of the resin in the first magnetic composition in terms of solid content is, for example, 2 mass % or more, preferably 5 mass % or more, and for example, 40 mass % or less, preferably 20 mass % or less.

The first magnetic composition preferably contains the thermosetting resin and the thermoplastic resin in combination. More preferably, as the thermosetting resin, an epoxy resin and a phenol resin are contained, and as the thermoplastic resin, an acrylic resin is contained. In this manner, when a plurality of semi-cured first layers (the first layers in a semi-cured state) to be described later are hot pressed to produce the first layer 1, a gap between interfaces of the semi-cured first layers can be surely embedded, so that the high-density and strong first layer 1 can be obtained. As a result, the heat resistance and the strength of the first layer 1 can be improved.

In this case, the content ratio of the epoxy resin with respect to the resin is, for example, 5 mass % or more, preferably 15 mass % or more, and for example, 50 mass % or less, preferably 35 mass % or less. The content ratio of the phenol resin with respect to the resin is, for example, 5 mass % or more, preferably 15 mass % or more, and for example, 50 mass % or less, preferably 35 mass % or less. The content ratio of the acrylic resin with respect to the resin is, for example, 15 mass % or more, preferably 35 mass % or more, and for example, 70 mass % or less, preferably 50 mass % or less.

The first magnetic composition can also contain an additive in addition to the description above. Examples of the additive include thermosetting catalyst, dispersant, and rheology controlling agent.

The thermosetting catalyst is a catalyst that accelerates curing of the thermosetting resin by heating, and examples thereof include imidazole compound, triphenylphosphine compound, triphenylborane compound, amino group-containing compound, and acid anhydride compound. Preferably, an imidazole compound is used.

Examples of the imidazole compound include 2-phenylimidazole (trade name: 2PZ), 2-ethyl-4-methylimidazole (trade name: 2E4MZ), 2-methylimidazole (trade name: 2MZ), 2-undecylimidazole (trade name: C11Z), 2-phenyl-1H-imidazole4,5-dimethanol (trade name: 2-PHZ-PW), and 2,4-diamino-6-[2'-methylimidazolyl (1')]-ethyl-s-triazine isocyanuric acid adduct (trade name: 2MAOK-PW) (the above-described products are all manufactured by Shikoku Chemicals Corporation).

These thermosetting catalysts can be used alone or in combination of two or more.

The content ratio of the thermosetting catalyst with respect to 100 parts by mass of the resin in terms of solid content is, for example, 0.1 parts by mass or more, preferably 0.5 parts by mass or more, and for example, 10 parts by mass or less, preferably 5 parts by mass or less. The content ratio of the thermosetting catalyst in the first magnetic composition in terms of solid content is, for example, 0.01 mass % or more, preferably 0.05 mass % or more, and for example, 1 mass % or less, preferably 0.5 mass % or less.

Examples of the dispersant include polyoxyalkylene alkyl ether phosphate ester and polyoxyalkylene alkyl phenyl ether phosphate ester. Preferably, polyoxyalkylene alkyl ether phosphate ester is used.

To be specific, examples of the dispersant include HIP-LAAD series manufactured by Kusumoto Chemicals, Ltd. ("ED-152", "ED-153", "ED-154", "ED-118", "ED-174", and "ED-251").

The acid value of the dispersant is, for example, 10 or more, preferably 15 or more, and for example, 200 or less, preferably 150 or less. The acid value is measured by a neutralization titration method or the like.

The content ratio of the dispersant with respect to 100 parts by mass of the soft magnetic particles in terms of solid content is, for example, 0.01 parts by mass or more, preferably 0.05 parts by mass or more, and for example, 1 part by mass or less, preferably 0.5 parts by mass or less. The content ratio of the dispersant in the first magnetic composition is, for example, 0.01 mass % or more, preferably 0.05 mass % or more, and for example, 1 mass % or less, preferably 0.5 mass % or less.

The first magnetic composition contains the dispersant, so that the soft magnetic particles can be uniformly dispersed in the first layer 1. Thus, the magnetic shield properties and the communication properties of the magnetic film 10 can be further more improved.

The rheology controlling agent is a compound that imparts thixotropic properties that show high viscosity in the case of low shear force (shear rate) and show low viscosity in the case of high shear force (shear rate) to the magnetic composition.

Examples of the rheology controlling agent include organic rheology controlling agent and inorganic rheology controlling agent. Preferably, an organic rheology controlling agent is used.

Examples of the organic rheology controlling agent include modified urea, urea-modified polyamide, fatty acid amide, polyurethane, and polymeric urea derivative. Preferably, a modified urea, a urea-modified polyamide, and a fatty acid amide are used, more preferably, a urea-modified polyamide is used.

Examples of the inorganic rheology controlling agent include silica, calcium carbonate, and smectite.

To be specific, examples of the rheology controlling agent include "BYK-410", "BYK-430", and "BYK-431" manufactured by BYK Japan KK and "DISPARLON PFA-131" manufactured by Kusumoto Chemicals, Ltd.

These rheology controlling agents can be used alone or in combination of two or more.

The content ratio of the rheology controlling agent with respect to 100 parts by mass of the soft magnetic particles in terms of solid content is, for example, 0.01 parts by mass or more, preferably 0.05 parts by mass or more, and for example, 1 part by mass or less, preferably 0.5 parts by mass or less. The content ratio of the rheology controlling agent in the first magnetic composition in terms of solid content is, for example, 0.01 mass % or more, preferably 0.05 mass % or more, and for example, 1 mass % or less, preferably 0.5 mass % or less.

The first magnetic composition contains the rheology controlling agent, so that even when the soft magnetic particles are contained in the first layer 1 at a high ratio, the soft magnetic particles can be uniformly dispersed in the first layer 1. Thus, the magnetic shield properties and the communication properties of the magnetic film 10 can be further more improved.

The first magnetic composition can also contain an additional additive in addition to the description above. Examples of the additional additive include commercially available or known additives such as cross-linking agent and inorganic filler.

The second layer 2 has a film shape, and is disposed on the entire upper surface of the first layer 1 so as to be in contact with the upper surface of the first layer 1.

The second layer 2, along with the first layer 1, is a layer for improving the magnetic shield properties and the communication properties of the coil module 11.

In the second layer 2, the real part ($\mu'$) of complex magnetic permeability at 10 MHz is 50 or more, preferably, 100 or more, more preferably 160 or more, and for example, 1500 or less, preferably 1000 or less, more preferably 800 or less, further more preferably 400 or less. By setting the real part of complex magnetic permeability within the above-described range, the magnetic flux can be converged at the inside of the magnetic film 10, and the magnetic shield properties can be improved.

Preferably, the real part of complex magnetic permeability of the second layer 2 is higher than that of the first layer 1. A difference between the real part of complex magnetic permeability of the first layer 1 and that of the second layer 2 is, for example, 10 or more, preferably 20 or more, more preferably 40 or more, and for example, 500 or less, preferably 300 or less. In this manner, the imaginary part of complex magnetic permeability of the second layer 2 can be further more surely higher than that of the first layer 1, so that the magnetic shield properties can be further more surely improved.

The imaginary part ($\mu''$) of complex magnetic permeability at 10 MHz is 30 or more, preferably 40 or more, more preferably 50 or more, and for example, 200 or less, preferably 150 or less, more preferably 100 or less, further more preferably 80 or less. By setting the imaginary part of complex magnetic permeability within the above-described range, the magnetic shield properties are excellent.

The imaginary part of complex magnetic permeability of the second layer 2 is higher than that of the first layer 1, and a difference between the imaginary part of complex magnetic permeability of the first layer 1 and that of the second layer 2 is, for example, 10 or more, preferably 30 or more, and for example, 200 or less, preferably 80 or less. In this manner, a loss of the magnetic flux in the first layer 1 is reduced, so that the deterioration of the communication properties can be further more suppressed. Also, leakage of the magnetic flux that is not completely shielded in the first layer 1 can be shielded in the second layer 2.

Preferably, the real part of complex magnetic permeability of the second layer 2 is higher than the imaginary part of complex magnetic permeability of the second layer 2. A difference between the real part of complex magnetic permeability and the imaginary part of complex magnetic permeability is, for example, 50 or more, preferably 100 or more, and for example, 1500 or less, preferably 500 or less. By setting the above-described difference within the above-described range, the magnetic shield properties of the second layer 2 can be further more excellent.

The thickness of the second layer 2 is, for example, 1 μm or more, preferably 5 μm or more, and for example, 500 μm or less, preferably 300 μm or less, more preferably 60 μm or less.

Preferably, the thickness of the second layer 2 is thinner than that of the first layer 1. To be more specific, the ratio (second layer/first layer) of the thickness of the second layer 2 to that of the first layer 1 is, for example, ½ or less, preferably ⅓ or less, more preferably ¼ or less, and for example, 1/10 or more. In this manner, both of the magnetic shield properties and the communication properties can be further more surely improved.

The second layer 2 is, for example, formed from a second magnetic composition containing the soft magnetic particles and the resin. The second layer 2 has excellent impact resistance, excellent crack resistance, and excellent molding properties by containing the soft magnetic particles and the resin.

The soft magnetic particles used in the second layer 2 are particles (high μ" soft magnetic particles) formed from a material having a high real part (μ') of complex magnetic permeability and a high imaginary part (μ") of complex magnetic permeability.

Examples of the material of the soft magnetic particles for the second layer 2 include Fe—Si—Al alloy, magnetic stainless steel (Fe—Cr—Al—Si alloy), Fe—Ni alloy, silicon copper (Fe—Cu—Si alloy), Fe—Si alloy, Fe—Si—B (—Cu—Nb) alloy, Fe—Si—Cr—Ni alloy, Fe—Si—Cr alloy, and Fe—Si—Al—Ni—Cr alloy. These soft magnetic particles can be used alone or in combination of two or more.

As the soft magnetic particles of the second layer 2, in particular, the soft magnetic particles having a coercive force in the easy direction of magnetization of, for example, 0.1 (Oe) or more, preferably 0.3 (Oe) or more, and for example, below 2.1 (Oe) are used.

Examples of the shape of the particle include bulk shape, flat shape (plate shape), and needle shape. Examples of the bulk shape include spherical shape, rectangular parallelepiped shape, granular shape, roundish shape, aggregate, or deformed shape thereof. In view of excellent real part of complex magnetic permeability and improvement of magnetic shield properties, preferably, a flat shape is used.

The aspect ratio of the soft magnetic particles of the second layer 2 is, for example, 8 or more, preferably 15 or more, and for example, 500 or less, preferably 450 or less.

The average particle size (average value of maximum length) of the soft magnetic particles of the second layer 2 is, for example, 3.5 μm or more, preferably 10 μm or more, more preferably above 40 μm, further more preferably 42 μm or more, and for example, 200 μm or less, preferably 150 μm or less, more preferably 100 μm or less. The average thickness thereof is, for example, 0.1 μm or more, preferably 0.2 μm or more, and for example, 3.0 μm or less, preferably 2.5 μm or less.

The mass ratio of the soft magnetic particles in the second magnetic composition in terms of solid content is, for example, 60 mass % or more, preferably 80 mass % or more, more preferably 85 mass % or more, and for example, 98 mass % or less, preferably 95 mass % or less. The volume ratio of the soft magnetic particles in the second magnetic composition in terms of solid content is, for example, 40% by volume or more, preferably 50% by volume or more, and for example, 90% by volume or less, preferably 70% by volume or less. By setting the content ratio of the soft magnetic particles in the above-described lower limit or more, the magnetic film 10 has excellent magnetic shield properties. Meanwhile, by setting the content ratio of the soft magnetic particles in the above-described upper limit or less, the second magnetic composition has excellent film forming properties.

An example of the resin includes the same resin as that described above in the first layer 1. Preferably, an epoxy resin, a phenol resin, and an acrylic resin are used in combination. The mixing ratio is the same as that described above in the first layer 1.

The second magnetic composition can also contain an additive in addition to the above-described component. As the additive, the same additive as that described above in the first layer 1 is used. Preferably, the thermosetting catalyst, the dispersant, and the rheology controlling agent are contained. The mixing ratio is the same as that described above in the first layer 1.

Preferably, the second magnetic composition is formed from the same material as that of the first magnetic composition except that the first layer soft magnetic particles are changed to the second layer soft magnetic particles. In this manner, a peeling caused by the difference of the material on the interface of the first layer 1 and the second layer 2 can be prevented, and the magnetic shield properties and the durability of the communication properties of the magnetic film 10 can be further more improved.

Next, a method for producing the magnetic film 10 is described.

The magnetic film 10 can be, for example, produced by a step of preparing a semi-cured first layer, a step of preparing a semi-cured second layer, and a step of hot pressing by laminating the semi-cured first layer and the semi-cured second layer.

First, the semi-cured first layer is prepared.

To be specific, the first magnetic composition is dissolved or dispersed in a solvent to prepare a first magnetic composition solution and subsequently, the first magnetic composition solution is applied to the surface of a peeling substrate to be dried.

The first magnetic composition is prepared by mixing the above-described components at the above-described ratio.

Examples of the solvent include organic solvents including ketones such as acetone and methyl ethyl ketone (MEK); esters such as ethyl acetate; ethers such as propylene glycol monomethyl ether; and amides such as N,N-dimethylformamide. Examples of the solvent also include water, and water-based solvents such as alcohols including methanol, ethanol, propanol, and isopropanol.

The solid content amount in the first magnetic composition solution is, for example, 10 mass % or more, preferably 30 mass % or more, and for example, 90 mass % or less, preferably 70 mass % or less.

Subsequently, the first magnetic composition solution is applied to the surface of the peeling substrate (separator, core material, or the like) to be dried.

Examples of the application method include doctor blade application, rolling application, screen application, and gravure application.

As the drying conditions, the drying temperature is, for example, 50° C. or more and 150° C. or less (preferably, 60° C. or more and 120° C. or less), and the drying time is, for example, 1 minute or more and 5 minutes or less.

Examples of the separator include polyethylene terephthalate (PET) film, polyethylene film, polypropylene film, and paper. Surfaces of these are subjected to release treatment with, for example, a fluorine release agent, a long-chain alkylacrylate release agent, and a silicone release agent.

Examples of the core material include plastic film (for example, polyimide film, polyester film, polyethylene terephthalate film, polyethylenenaphthalate film, polycarbonate film, or the like), metal film (for example, aluminum foil or the like), resin substrate reinforced with glass fiber or plastic-made nonwoven fiber, silicon substrate, and glass substrate.

The average thickness of the peeling substrate is, for example, 1 µm or more and 500 µm or less.

In this manner, the semi-cured first layer that is the first layer in a semi-cured state (B-stage state) is obtained.

The semi-cured state (B-stage state) is a state between an uncured state (A-stage state) of being soluble in a solvent and a cured state (C-stage state) of being completely cured at a room temperature (25° C.). The semi-cured state (B-stage state) is a state in which curing and gelation slightly proceed, the composition is swollen but not completely dissolved in the solvent, and softened by heating but not melted.

In addition to the semi-cured first layer, a semi-cured second layer is prepared.

To be specific, the second magnetic composition is dissolved or dispersed in a solvent to prepare a second magnetic composition solution and subsequently, the second magnetic composition solution is applied to the surface of the peeling substrate to be dried.

The second magnetic composition is prepared by mixing the above-described components at the above-described ratio.

The solvent, the application conditions, and the drying conditions are the same as those in the step of preparing the semi-cured first layer described above.

Next, the semi-cured first layer and the semi-cured second layer are laminated to be hot pressed.

In the lamination, the plurality or a singular number of semi-cured first layer and the plurality or a singular number of semi-cured second layer are laminated so that the semi-cured first layer and the semi-cured second layer have a predetermined thickness.

Preferably, the plurality (preferably, 2 to 10 pieces) of semi-cured first layers and a singular number of semi-cured second layer are laminated so that the thickness of the first layer 1 is larger than that of the second layer 2.

Subsequently, a semi-cured laminate is hot pressed in the thickness direction.

The hot pressing can be performed by using a known press, and for example, a parallel plate press is used. By hot pressing the semi-cured laminate, a magnetic body in the first layer 1 and the second layer 2 fills at a high ratio, and when the soft magnetic particles are flat, the flat soft magnetic particles can be oriented in the plane direction. Thus, the magnetic shield properties and the communication properties can be further more excellent.

The heating temperature is, for example, 130° C. or more, preferably 150° C. or more, and for example, 250° C. or less, preferably 200° C. or less.

The hot pressing time is, for example, 1 minute or more, preferably 2 minutes or more, and for example, 24 hours or less, preferably 2 hours or less.

The pressure is, for example, 0.1 MPa or more, preferably 1 MPa or more, more preferably 10 MPa or more, and for example, 200 MPa or less, preferably 100 MPa or less.

In this manner, each of the semi-cured first layer and the semi-cured second layer cures by heating to be brought into a completely curing state (C-stage state) and simultaneously, the semi-cured first layer is strongly brought into tight contact with the semi-cured second layer. As a result, the magnetic film 10 including the first layer 1 and the second layer 2 is obtained.

The total thickness of the magnetic film 10 is, for example, 20 µm or more, preferably 50 µm or more, and for example, 2500 µm or less, preferably 500 µm or less, more preferably 200 µm or less.

Next, the coil module 11 is described.

Figure 2:
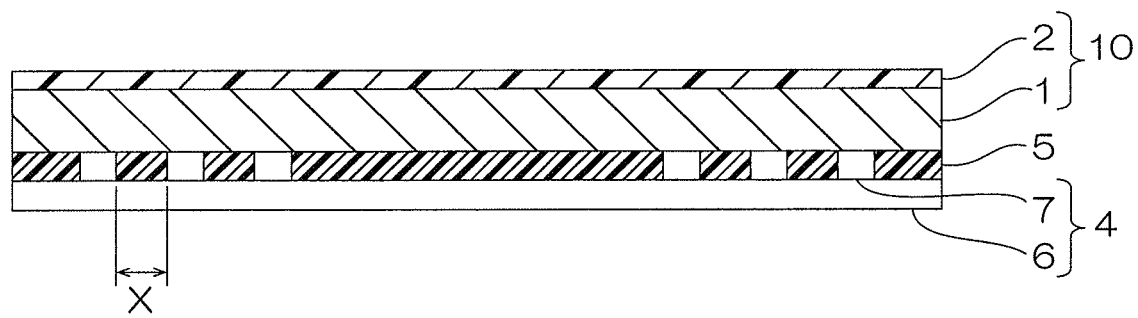
FIG. 2 shows a cross-sectional view of a coil module including the magnetic film of FIG. 1.

As shown in FIG. 2, the coil module 11 sequentially includes the coil board 4, an adhesive layer 5, and the magnetic film 10 in the thickness direction. The coil module 11 preferably consists of the coil board 4, the adhesive layer 5, and the magnetic film 10. The coil module 11 is, for example, one component of a power-receiving coil module used in the wireless communication and the wireless power transmission in which a signal and an electric power are transmitted wirelessly between power transmission and reception modules. The coil module 11 is an industrially available device which alone is circulated.

The coil board 4 is, for example, a circuit board used in the wireless communication or the wireless power transmission using a frequency band of 13.56 MHz or 6.78 MHz, and includes a base board 6 as a board and a coil pattern 7.

The base board 6 forms an outer shape of the coil module 11 and has a film shape. Examples of an insulating material that constitutes the base board 6 include glass epoxy board, glass board, ceramic board, PET board, fluorine resin board, and polyimide board. In view of flexibility, preferably, a PET board, a fluorine resin board, and a polyimide board are used.

The thickness of the base board 6 is, for example, 5 µm or more, preferably 8 µm or more, and for example, 100 µm or less, preferably 80 µm or less.

The coil pattern 7 is provided at the upper side (one side in the thickness direction) of the base board 6. To be specific, the coil pattern 7 is disposed on the upper surface of the base board 6 so that the lower surface of the coil pattern 7 is in contact with the upper surface of the base board 6.

The coil pattern 7 is formed by one continuous wire 8 in a spiral shape, and may be either a circular shape (including an elliptic shape) or a rectangular shape.

Examples of a material that constitutes the wire 8 include metals such as copper, nickel, tin, aluminum, iron, chromium, titanium, gold, silver, platinum, niobium, and alloy including those and electrically conductive polymers such as polyaniline, polypyrrole, polythiophene, polyacetylene, polyparaphenylene, polyphenylenevinylene, polyacrylonitrile, and polyoxadiazole. These materials can be used alone or in combination of two or more. Preferably, a metal is used, more preferably, copper is used.

The width of the wire 8 is, for example, 10 µm or more, preferably 20 µm or more, and for example, 2000 µm or less, preferably 1800 µm or less.

The gap of the wire 8 (between pitches, length of X shown in FIG. 2) is, for example, 10 µm or more, preferably 20 µm or more, and for example, 3 mm or less, preferably 2 mm or less.

The thickness (height) of the wire 8 is, for example, 5 µm or more, preferably 8 µm or more, and for example, 100 µm or less, preferably 80 µm or less.

The adhesive layer 5 is provided at the upper side of the coil board 4. To be specific, the adhesive layer 5 is disposed between the base board 6 and the magnetic film 10 so as to cover the side surfaces of the coil pattern 7 and to be in contact with the upper surface of the base board 6 and the lower surface of the magnetic film 10.

The adhesive layer 5 is formed from an adhesive composition into a film shape.

As the adhesive composition, a known or commercially available adhesive is used.

Also, the same resin and the same additive as those of the first magnetic composition described above can be used. To be specific, the adhesive composition containing a resin, and an additive added as needed is used. Preferably, the adhesive composition containing the resin consisting of the epoxy resin, the phenol resin, and the acrylic resin and the thermosetting catalyst is used.

The thickness of the adhesive layer 5 is generally the same as that of the wire 8, and for example, 5 µm or more, preferably 8 µm or more, and for example 100 µm or less, preferably 80 µm or less.

The magnetic film 10 is disposed on the upper surface of the coil pattern 7 and the upper surface of the adhesive layer 5 so that the first layer 1 is in contact with the upper surface of the coil pattern 7 and the upper surface of the adhesive layer 5.

The coil module 11 is, for example, obtained by laminating the coil board 4, a semi-cured adhesive layer, and the magnetic film 10 to be hot pressed.

The semi-cured adhesive layer is obtained by dissolving or dispersing an adhesive composition in a solvent to prepare an adhesive composition solution, and subsequently, applying the obtained adhesive composition solution to the surface of a peeling substrate to be dried. The semi-cured adhesive layer can be prepared under the same conditions as those of the semi-cured first layer other than the material of the adhesive composition.

The hot pressing can be also performed under the same conditions as those of the method for producing the magnetic film 10.

In the coil module 11 of FIG. 2, the upper surface of the coil pattern 7 is in direct contact with the lower surface of the first layer 1. Alternatively, for example, though not shown, the upper surface of the coil pattern 7 may not be in direct contact with the lower surface of the first layer 1. That is, the thickness of the adhesive layer 5 is formed larger than that of the coil pattern 7, and the first layer 1 may be disposed on the entire upper surface of the adhesive layer 5.

In the coil module 11 of FIG. 2, the magnetic film 10 is disposed at the upper side of the coil board 4 via the adhesive layer 5. Alternatively, for example, though not shown, the magnetic film 10 can be also disposed at the upper side of the coil board 4 without having the adhesive layer 5. To be more specific, the coil module 11 consists of the coil board 4 and the magnetic film 10 that is disposed on the upper surface thereof. In this embodiment, the coil pattern 7 is embedded in the first layer 1 so that the upper and side surfaces of the coil pattern 7 are covered with the first layer 1. This embodiment can be, for example, obtained by directly laminating the semi-cured first layer and the semi-cured second layer on the coil board 4 to be hot pressed.

In the coil module 11 of FIG. 2, the magnetic film 10 is disposed on the side of the coil pattern 7 of the coil board 4. Alternatively, for example, though not shown, the magnetic film 10 can be also disposed on the side surface opposite to the side of the coil pattern 7 of the coil board 4.

In the coil module 11 of FIG. 2, the coil pattern 7 is formed only on the upper surface of the base board 6. Alternatively, for example, the coil pattern 7 can be also formed on the upper and lower surfaces of the base board 6.

According to the magnetic film 10 and the coil module 11 including the magnetic film 10, the first layer 1 having the real part of complex magnetic permeability of 50 or more and the imaginary part of complex magnetic permeability of below 30 at 10 MHz, and the second layer 2 that is disposed on the first layer 1 and having the real part of complex magnetic permeability of 50 or more and the imaginary part of complex magnetic permeability of 30 or more are included. Thus, the magnetic shield properties and the communication properties are excellent. In particular, in the wireless communication or the wireless power transmission using a high frequency of a frequency band of 13.56 MHz or 6.78 MHz, interference in a metal member around the coil module 11 can be reduced, while the communication properties of the coil module 11 are excellently retained.

In the magnetic film 10, the first layer 1 contains the soft magnetic particles and the resin, and the second layer 2 contains the soft magnetic particles and the resin. Thus, the magnetic film 10 has flexibility, so that the impact resistance, the crack resistance, and the handling properties are excellent as compared to the ferrite sheet or the like. The magnetic film 10 is excellent in the above-described properties with a small thickness, so that the thin coil module 11 can be achieved.

The coil module 11 including the magnetic film 10 can be used in the coil module for the wireless communication or the wireless power transmission using a frequency band of 13.56 MHz or 6.78 MHz, and preferably can be used as a receiving coil module of NFC (short-range wireless communication). To be specific, examples of a product including the coil module include contactless IC card and smartphone for the use of the wireless communication and cordless telephone, electric shaver, and electric toothbrush for the use of the wireless power transmission.

In the above-described embodiment, the first layer 1 is formed from the first magnetic composition containing the soft magnetic particles and the resin. Alternatively, for example, though not shown, the first layer 1 may be a layer made of a sintered body of a soft magnetic oxide.

The layer made of the sintered body of the soft magnetic oxide is, for example, a layer obtained by sintering a metal oxide (for example, a metal oxide containing Fe) that shows soft magnetic properties, and a preferable example thereof includes a ferrite sheet. According to the embodiment, the real part of complex magnetic permeability of the first layer 1 can be further more enlarged, so that the magnetic shield properties are excellent.

In the above-described embodiment, the first layer 1 and the second layer 2 are in a completely cured state. Alternatively, the first layer 1 and/or the second layer 2 may be also in a semi-cured state.

EXAMPLES

In the following, the present invention is further described based on Examples and Comparative Examples. The present invention is however not limited by Examples and Comparative Examples. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Example 1

(Preparation of First Layer)

In a magnetic composition, in terms of solid content, 90.3 parts by mass of low μ" soft magnetic particles A (coercive force in the easy direction of magnetization of 3.9 (Oe)), 2.5 parts by mass of cresol novolak epoxy resin, 2.6 parts by mass of phenol biphenylene resin, 4.2 parts by mass of acrylic resin, 0.1 parts by mass of thermosetting catalyst, 0.1 parts by mass of dispersant, and 0.2 parts by mass of rheology controlling agent were mixed so that the volume ratio of the soft magnetic particles was 60.0% by volume, thereby obtaining a first magnetic composition.

The first magnetic composition was dissolved in methyl ethyl ketone, so that a first magnetic composition solution having a solid content concentration of 41 mass % was prepared.

The first magnetic composition solution was applied onto a separator (PET film subjected to silicone release treatment) to be then dried at 110° C. for 2 minutes. In this manner, a first layer (thickness of 20 μm) in a semi-cured state was produced.

(Preparation of Second Layer)

A second layer (thickness of 20 μm) in a semi-cured state was produced in the same manner as that in the first layer, except that high μ" soft magnetic particles were used instead of the low μ" soft magnetic particles A.

(Production of Magnetic Film)

Five layers of the first layer in a semi-cured state were prepared, and one layer of the second layer in a semi-cured state was prepared. These prepared layers were laminated so that the second layer was the topmost layer. The laminate was hot pressed under the conditions of 175° C., 30 minutes, and 20 MPa, so that each of the layers completely cured. In this manner, a magnetic film including the first layer (thickness of 100 μm) and the second layer (thickness of 20 μm) was produced (ref: FIG. 1).

Example 2

A magnetic film of Example 2 was produced in the same manner as that of Example 1, except that low μ" soft magnetic particles B (coercive force in the easy direction of magnetization of 2.9 (Oe)) were used instead of the low μ" soft magnetic particles A (coercive force in the easy direction of magnetization of 3.9 (Oe)).

Example 3

As the first layer, a ferrite sheet (thickness of 100 μm) was prepared, and the second layer in a semi-cured state prepared in Example 1 was laminated on the ferrite sheet to be hot pressed under the conditions of Example 1. In this manner, a magnetic film of Example 3 was produced.

Example 4

A magnetic film of Example 4 was produced in the same manner as that of Example 1, except that the thickness of the first layer was changed to 50 μm, and the thickness of the second layer was changed to 70 μm.

Comparative Example 1

Without using the second layer in a semi-cured state, six pieces of the first layer only in a semi-cured state were laminated to be hot pressed. In this manner, a magnetic body including the first layer (thickness of 120 μm) only was defined as a magnetic film of Comparative Example 1.

Comparative Example 2

As the first layer, a ferrite sheet (thickness of 120 μm) was prepared, and the sheet only was defined as a magnetic film of Comparative Example 2.

Comparative Example 3

Without using the first layer in a semi-cured state, six pieces of the second layer only in a semi-cured state were laminated to be hot pressed. In this manner, a magnetic body including the second layer (thickness of 120 μm) only was defined as a magnetic film of Comparative Example 3.

Comparative Example 4

(Preparation of First Layer)

In a magnetic composition, in terms of solid content, 72.6 parts by mass of low μ" soft magnetic particles A (coercive force in the easy direction of magnetization of 3.9 (Oe)), 7.3 parts by mass of cresol novolak epoxy resin, 7.4 parts by mass of phenol biphenylene resin, 12.3 parts by mass of acrylic resin, 0.3 parts by mass of thermosetting catalyst, and 0.1 parts by mass of dispersant were mixed so that the volume ratio of the soft magnetic particles was 30.0% by volume, thereby obtaining a first magnetic composition.

The first magnetic composition was dissolved in methyl ethyl ketone, so that a first magnetic composition solution having a solid content concentration of 37 mass % was prepared.

The first magnetic composition solution was applied onto a separator (PET film subjected to silicone release treatment) to be then dried at 110° C. for 2 minutes. In this manner, a first layer (thickness of 20 μm) in a semi-cured state was produced.

(Preparation of Second Layer)

A second layer in a semi-cured state was prepared in the same manner as that of the second layer of Example 1.

(Production of Magnetic Film)

Five layers of the first layer in a semi-cured state were prepared. Meanwhile, the second layer in a semi-cured state was hot pressed under the conditions of 175° C., 30 minutes, and 20 MPa, so that the cured second layer (20 μm) was obtained.

Next, five layers of the first layer in a semi-cured state were laminated on the cured second layer, and the laminate was hot pressed under the conditions of 175° C., 30 minutes, and 1 MPa. In this manner, a magnetic film of Comparative Example 4 including the first layer (thickness of 100 μm) and the second layer (thickness of 20 μm) was produced.

Comparative Example 5

(Preparation of First Layer)

A first layer in a semi-cured state was prepared in the same manner as that of the first layer of Example 1.

(Preparation of Second Layer)

A second layer in a semi-cured state was prepared in the same manner as that of the first layer of Comparative Example 4.

(Production of Magnetic Film)

Five layers of the first layer in a semi-cured state were prepared to be hot pressed under the conditions of 175° C., 30 minutes, and 20 MPa, so that the cured first layer (100 μm) was obtained.

Next, one layer of the second layer in a semi-cured state was laminated on the cured first layer, and the laminate was hot pressed under the conditions of 175° C., 30 minutes, and 1 MPa. In this manner, a magnetic film of Comparative Example 5 including the first layer (thickness of 100 μm) and the second layer (thickness of 20 μm) was produced.

<Measurement of Real Part of Complex Magnetic Permeability and Imaginary Part of Complex Magnetic Permeability>

As for each of the first layer and the second layer of Examples and Comparative Examples, a real part μ' of complex magnetic permeability and an imaginary part μ" of complex magnetic permeability were measured by a one-turn method (frequency of 10 MHz) by using an impedance analyzer (manufactured by Agilent Technologies, "4294A").

<Production of Coil Module>

A coil board in which a rectangular loop coil was formed on the upper surface of a base board (made of polyimide, thickness of 20 μm) was prepared. The width of the wire of the loop coil was 1000 μm, the height of the wire was 20 μm, and a gap X (pitch) between the wire was 500 μm.

As the adhesive composition, 18.7 parts by mass of bisphenol A epoxy resin, 6.9 parts by mass of cresol novolak epoxy resin, 28.2 parts by mass of phenol biphenylene resin, 45.2 parts by mass of acrylic resin, and 1.0 part by mass of thermosetting catalyst were mixed and dried, so that a semi-cured adhesive layer was produced.

Each of the magnetic films of Examples and Comparative Examples was disposed at the coil board via the semi-cured adhesive layer so that the coil board faced the first layer. Subsequently, the obtained laminate was hot pressed under the conditions of 175° C., 30 minutes, and 0.5 MPa, so that the semi-cured adhesive layer completely cured. In this manner, a coil module sequentially including the coil board, the adhesive layer, and the magnetic film was produced (ref: FIG. 2).

<Evaluation of Magnetic Shield Properties>

Figure 3:
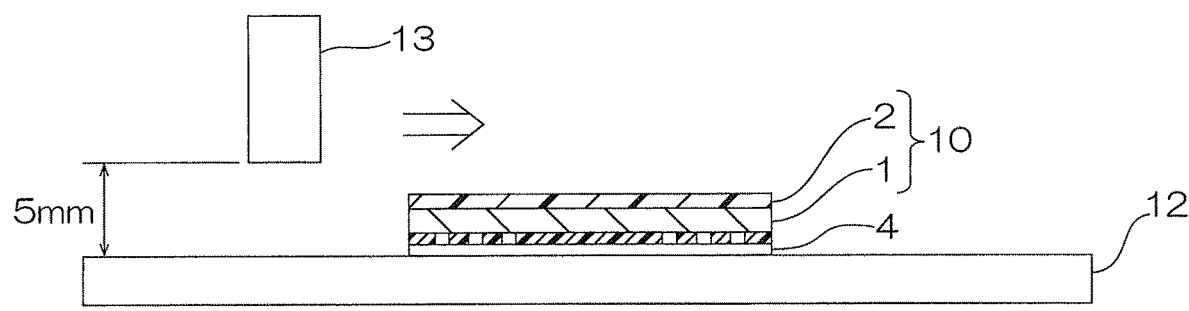
FIG. 3 shows a schematic view for evaluating the magnetic shield properties of Examples.

Each of the coil modules 11 was disposed on the upper surface of a pedestal 12 so that the magnetic film 10 was at the upper side, and subsequently, a magnetic probe 13 was moved in a horizontal direction so as to cross the coil module 11 at a position of 5 mm high from the upper surface of the pedestal 12 (ref: FIG. 3). As the magnetic probe 13, "MP-10L" manufactured by NEC Engineering, Ltd. was used, and an applied electric current to the coil was defined as 40 mA and 13.56 MHz. The magnetic field strength at this time was measured with the magnetic probe.

As a reference coil module, the coil board without including the adhesive layer and the magnetic film was used, and the magnetic field strength of the reference coil module was also measured in the same manner as that described above.

As for each of the coil modules, compared to the magnetic field strength of the reference coil module, a case where the magnetic field strength was reduced by 3.5 dBuA/m or more was evaluated as "Excellent"; a case where the magnetic field strength was reduced by 2.5 dBuA/m or more and below 3.5 dBuA/m was evaluated as "Good"; and a case where the magnetic field strength was reduced by below 2.5 dBuA/m was evaluated as "Bad".

(Evaluation of Communication Properties and Evaluation of Magnetic Field Radiation Strength)

Figure 4:
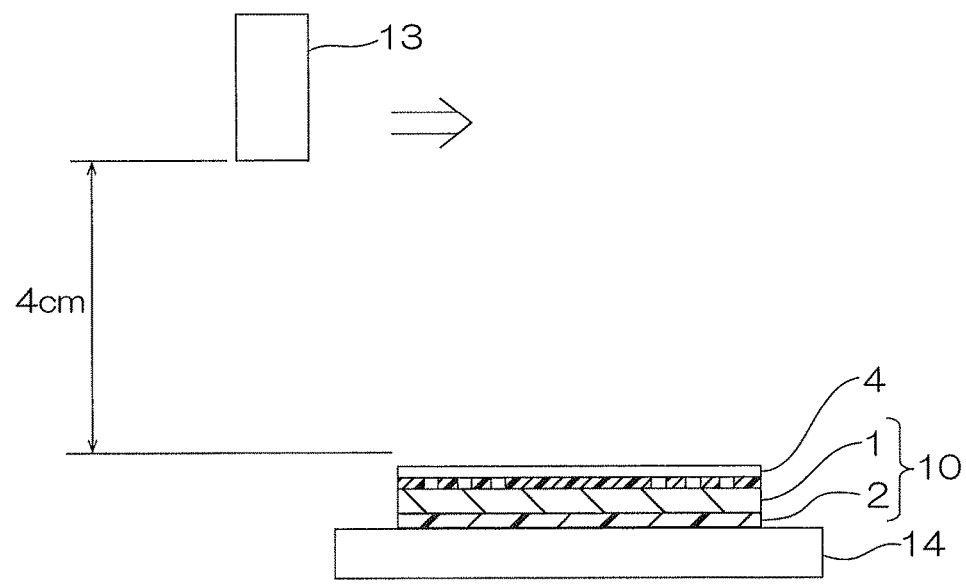
FIG. 4 shows a schematic view for evaluating the communication properties of Examples.

Each of the coil modules 11 was disposed on the upper surface of an aluminum board 14 having a thickness of 1 mm so that the coil board 4 was at the upper side, and subsequently, the magnetic probe 13 was moved in the horizontal direction so as to cross the coil module 11 at a position of 4 cm high from the upper surface of the coil board 4 (ref: FIG. 4). As the magnetic probe 13, "MP-10L" manufactured by NEC Engineering, Ltd. was used, and an applied electric current to the coil was defined as 40 mA and 13.56 MHz. The magnetic field strength at this time was measured with the magnetic probe.

As for each of the coil modules, compared to the magnetic field radiation strength of the coil module of Comparative Example 3, a case where the magnetic field radiation strength was high by 10 dBuA/m or more was evaluated as "Excellent"; a case where the magnetic field radiation strength was high by 1 dBuA/m or more and below 10 dBuA/m was evaluated as "Good"; and a case where the magnetic field radiation strength was equal or less was evaluated as "Bad".

TABLE 1

| | First Layer | | | Second Layer | | | | | |
|---|---|---|---|---|---|---|---|---|---|
| | Real Part μ' of Magnetic Permeability | Imaginary Part μ" of Magnetic Permeability | Thickness (μm) | Real Part μ' of Magnetic Permeability | Imaginary Part μ" of Magnetic Permeability | Thickness (μm) | Total Thickness (μm) | Magnetic Shield Properties | Communication Properties |
| Ex. 1 | 93 | 3 | 100 | 184 | 53 | 20 | 120 | Good | Excellent |
| Ex. 2 | 125 | 12 | 100 | 184 | 53 | 20 | 120 | Excellent | Excellent |
| Ex. 3 | 155 | 2 | 100 | 184 | 53 | 20 | 120 | Excellent | Excellent |
| Ex. 4 | 93 | 3 | 50 | 184 | 53 | 70 | 120 | Good | Good |
| Comp. Ex. 1 | 93 | 3 | 120 | — | — | — | 120 | Bad | Excellent |
| Comp. Ex. 2 | 155 | 2 | 120 | — | — | — | 120 | Bad | Excellent |
| Comp. Ex. 3 | — | — | — | 184 | 53 | 120 | 120 | Good | Bad |
| Comp. Ex. 4 | 47 | 2 | 100 | 184 | 53 | 20 | 120 | Bad | Bad |
| Comp. Ex. 5 | 93 | 3 | 100 | 47 | 2 | 20 | 120 | Bad | Excellent |

The numerical value in each of the components in Table shows the solid content. The numerical value in each of the components in Table shows parts by mass unless otherwise specified. As for each of the components in Examples and Table, the details are described in the following.

Low μ" soft magnetic particles A: Fe—Si—Al alloy, flat shape, average particle size of 40 μm, average thickness of 1 μm, coercive force in the easy direction of magnetization of 3.9 (Oe)

Low μ" soft magnetic particles B: Fe—Si—Al alloy, flat shape, average particle size of 40 μm, average thickness of 1 μm, coercive force in the easy direction of magnetization of 2.9 (Oe)

High μ" soft magnetic particles: Fe—Si—Al alloy, flat shape, average particle size of 43 μm, average thickness of 1 μm, coercive force in the easy direction of magnetization direction of 1.5 (Oe)

Ferrite sheet: sintered body of oxide of (Fe, Ni, Cu, Zn), each of the thickness of 100 μm and the thickness of 120 μm is prepared Cresol novolak epoxy resin: epoxy equivalent of 199 g/eq., trade name: "Kl-3000-4", manufactured by Tohto Kasei Co., Ltd.

Phenol biphenylene resin: hydroxyl equivalent of 203 g/eq., trade name "MEH-7851SS", manufactured by MEIWA PLASTIC INDUSTRIES, LTD.

Acrylic resin: carboxy group and hydroxy group-modified ethyl acrylate-butyl acrylate-acrylonitrile copolymer, weight average molecular weight of 900,000, trade name: "TEISANRESIN SG-70L" (resin content ratio of 12.5 mass %), manufactured by Nagase ChemteX Corporation Thermosetting catalyst: 2-phenyl-1H-imidazole 4,5-dimethanol, trade name: "CUREZOL 2PHZ-PW", manufactured by SHIKOKU CHEMICALS CORPORATION Dispersant: polyether phosphate, acid value of 17, trade name: "HIPLAAD ED152", manufactured by Kusumoto Chemicals, Ltd.

Rheology controlling agent: urea-modified medium-polarity polyamide, trade name: "BYK430" (solid content of 30 mass %), manufactured by BYK Japan KK While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The magnetic film and the coil module of the present invention can be applied in various industrial products, and can be, for example, preferably used for the coil module used in the wireless communication and the wireless power transmission.

DESCRIPTION OF REFERENCE NUMERALS

1 First layer
2 Second layer
4 Coil board
6 Base board
7 Coil pattern
10 Magnetic film
11 Coil module

The invention claimed is:

1. A magnetic film comprising:
a first layer having a real part of complex magnetic permeability of 50 or more and an imaginary part of complex magnetic permeability of below 30 at 10 MHz, and
a second layer provided on the first layer and having a real part of complex magnetic permeability of 50 or more and an imaginary part of complex magnetic permeability of 30 or more at 10 MHz.

2. The magnetic film according to claim 1, wherein the real part of complex magnetic permeability of the second layer is higher than that of the first layer.

3. The magnetic film according to claim 1, wherein the thickness of the second layer is smaller than that of the first layer.

4. The magnetic film according to claim 3, wherein the ratio of the thickness of the second layer to that of the first layer is ½ or less.

5. The magnetic film according to claim 1, wherein the first layer contains soft magnetic particles and a resin.

6. The magnetic film according to claim 1, wherein the first layer is made of a sintered body of a soft magnetic oxide.

7. The magnetic film according to claim 1, wherein the second layer contains soft magnetic particles and a resin.

8. A coil module for wireless communication or wireless power transmission using a frequency band of 13.56 MHz or 6.78 MHz comprising:
a coil board including a board and a coil pattern provided at one side in a thickness direction of the board, and
the magnetic film according to claim 1 provided at one side in the thickness direction of the coil module so as to allow the first layer to face the coil pattern.

* * * * *